US 6,717,914 B1

(12) United States Patent
Hamami

(10) Patent No.: US 6,717,914 B1
(45) Date of Patent: Apr. 6, 2004

(54) SYSTEM FOR PROBING SWITCHED VIRTUAL CIRCUITS IN A CONNECTION ORIENTED NETWORK

(75) Inventor: Ilan Hamami, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,120

(22) Filed: May 27, 1999

(51) Int. Cl.[7] .............................................. H04J 12/26
(52) U.S. Cl. ...................... 370/248; 370/251; 370/390
(58) Field of Search ..................... 370/241.1, 246–248, 370/252, 270, 278, 282–283, 293, 310.1, 312, 319, 384, 390, 395.1, 395.51, 397, 399, 400, 409, 905

(56) References Cited

U.S. PATENT DOCUMENTS

| 5,610,905 | A | * | 3/1997 | Murthy et al. | 370/401 |
| 5,894,471 | A | * | 4/1999 | Miyagi et al. | 370/230 |
| 5,930,238 | A | * | 7/1999 | Nguyen | 370/270 |
| 6,222,842 | B1 | * | 4/2001 | Sasyan et al. | 370/397 |
| 6,226,263 | B1 | * | 5/2001 | Iwase et al. | 370/398 |

OTHER PUBLICATIONS

William Stallings, "ATM and SONET/SDH", ISDN and Broadband ISDN, 1992, pp. 529–546.

Yuval S. Boger, "An Introduction to ATM Signaling", RAD-COM LTD, TB-6/95, pp. 1–21.

Yuval S. Boger, "ATM Signaling Testing Pitfalls", RAD-COM LTD, 1995, pp. 1–6.

* cited by examiner

Primary Examiner—Huy D. Vu
Assistant Examiner—Justin Philpott
(74) Attorney, Agent, or Firm—Howard Zaretsky; McDonnell Boehnen Hulbert & Berghoff

(57) ABSTRACT

A system for probing one or more SVCs that enables a network manager station to setup a probe event in advance before a SVC is created. Upon the creation of the SVC, the data is captured and sent to the network management station without any further intervention required. In a first stage, a SVC originator is configured with a probing IE containing parameters to be included in the SETUP request message when SVCs are established. A unique identifier is included as one of the parameters in the probing IE and is used by the probing switch to detect a SVC that is to be probed. A PVC is established to the switch containing one or more SVCs that are to be probed. A probing port is configured on the switch and a range of VPI/VCIs are assigned to the port. A multicast connection is configured in the switch and traffic from the SVC originator is directed toward both the destination and to the probing port. In this fashion, the SVC traffic can be analyzed using diagnostic tools located remotely anywhere on the network.

30 Claims, 6 Drawing Sheets

SYSTEM FOR PROBING SWITCHED VIRTUAL CIRCUITS IN A CONNECTION ORIENTED NETWORK

FIELD OF THE INVENTION

The present invention relates generally to data communications networks and more particularly relates to a system for probing selected Switched Virtual Circuits (SVCs) in a connection oriented network such as an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

SVC Traffic Analysis

Networks that are connection oriented typically have two stages for connecting network users from point to point. The first stage in the establishment of the colnection utilizes some form of signaling mechanism and in the second stage, data is transferred via the connection established in the first stage.

An example of such as connection oriented network is an ATM network. ATM networks utilize a signaling protocol that is derived from the Q.93B standard to provide network users a service for establishing a connection to another network user. This connection is termed a Switched Virtual Connection (SVC) and, once created, is used as the data path between the users that have been connected.

The connection originator uses the signaling protocol to convey the service details it is requesting the network to provide, e.g., destination address (i.e. the called address), calls of service, traffic descriptor, protocol which is to be used by the virtual connection, network transit, etc. In addition, the originator provides information about itself, in particular, its own address (i.e. the calling address).

Once the network receives the request from the originator user, it attempts to find a route to the destination that has sufficient resources to fulfill the specific characteristic requirements of the request as provided by the originating user. If the network finds a satisfactory route with the necessary resources to establish the connection, and if the called user also has sufficient resources to establish the connection, the connection is then established. Once the route is established, data can flow between source and destination over the connection.

Such a network may carry another type of connection known as a Permanent Virtual Circuit (PVC) which are typically established under manual management control. The service provided by PVCs and SVCs are the same, with the difference being their method of establishment.

In the course of network operations, SVCs may be constantly created and torn down. SVC connections may be created very quickly and last for a relatively short lifetime duration, i.e., hundreds, of milliseconds, seconds, etc., before being removed. In the event a network manager desires to capture SVC traffic for purposes of analysis, the specific SVC must first be identified, and data somehow routed to the management station. Normally, this must be done manually, without effecting the original data path, and without any synchronization in time with the establishment of the SVC and the data being transferred over it. Although it is possible for a network manager to capture data from the SVC, the establishment of the capture mechanism may take many tens of minutes depending on the type and sophistication of the management tools available. During this time the SVC may have already been established and removed making its capture impossible using current techniques.

It would therefore be desirable to have a capture mechanism that can be utilized by a network management station and that is capable of capturing very, short lived SVCs without interfering or effecting the flow of data over the SVC from calling to called users.

SUMMARY OF THE INVENTION

The present invention is a system for probing one or more SVCs that enables a network management station to setup a probe event in advance before a SVC is created. Upon the creation of the SVC, the data is captured and sent to the network management station without any further intervention required. Note that the system of the present invention is applicable to any connection-oriented network that utilizes signaling to establish connections between network users.

The invention establishes a SVC probe in two stages. In the first stage, a SVC originator is configured with a probing IE containing parameters to be included in the SETUP request message when SVCs are established. The probing IE is generated by the network management station and sent to the SVC originator using standard SNMP techniques. A unique identifier is included as one of the parameters in the probing IE. It is used by the probing switch to detect a SVC that is to be probed.

A PVC is established to the switch containing one or more SVCs that are to be probed. A probing port is configured on the switch and a range of VPI/VCIs are assigned to the port. The same unique identifier is configured in the switch to be probed.

In operation, the switches along the path, attempt to find a match between the unique identifier included in the SETUP request message and that previously configured by the management station. If a match is found, a multicast connection is configured in the switch and traffic from the SVC originator is directed toward both the destination and the probing port. Likewise, traffic from the destination is directed toward both the SVC originator and the probing port. In this fashion, the SVC traffic can be analyzed using diagnostic tools located remotely anywhere in the network.

The probing system of the present invention can also be used to probe multiple SVCs from the same or different SVC originators. In addition, multiple network management stations can coexist with each setting up multiple probing ports on different switches. In this case, each switch maintains a table of probe identifiers and maps each to a different probing port with each probing port corresponding to a different PVC.

There is provided in accordance with the present invention, in a connection oriented network capable of establishing Switched Virtual Circuits (SVCs) and Permanent Virtual Circuits (PVCs), a method of probing one or more SVCs established by a SVC originator comprising the steps of configuring, from a network management station, a SVC originator with a first set of probe parameters comprising a global probing ID, configuring, from the network management station, a probing switch with a second set of probing parameters comprising the global probing ID, establishing, from the network management station, a PVC to a designated probing port on the probing switch, incorporating the first set of probing parameters in a setup request message at the time the SVC originator established a SVC to a destination and copying bidirectional traffic between the SVC originator and the destination to the network management station via the PVC.

The first set of probing parameters comprises initial probing VPI/VCI and maximum probing VPI/VCI parameters, whereby upon each successive SVC established, the SVC originator increments the VCI up to the maximum. The first set of probing parameters comprises a probing enable/disable parameter operative to turn probing off in the SVC originator. The setup message comprises a probing Information Element (IE) comprising the global probing ID, initial probing VPI/VCI, maximum probing VPI/VCI and probing enable/disable parameters.

The SVC originator is configured utilizing Simple Network Management Protocol (SNMP) messages generated by the network management station. The probing switch is configured utilizing Simple Network Management Protocol (SNMP) messages generated by the network management station.

The step of copying comprises the step of establishing a multicast connection from a port receiving traffic from the SVC originator to a port sending traffic toward the destination port and to the probing port and the step of copying comprises the step of establishing a multicast connection from a port receiving traffic from the destination to a port sending traffic toward the SVC originator and to the probing port.

The method further includes the step of maintaining a table of global probing IDs when a plurality of SVC originators are present in the network. The method further includes the step of ceasing, on the SVC originator, to incorporate the first set of probing parameters in the setup message when a maximum probing VPI/VCI has been reached.

The method further includes the step of assigning, in the probing switch, odd VPI/VCI numbers for the probing port to traffic flowing in a first direction and even VPI/VCI numbers for traffic flowing in a second direction opposite that of the first direction. The method further includes the step of assigning, in the probing switch, even VPI/VCI numbers for the probing port to traffic from the SVC originator.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term  | Definition                                              |
| ----- | ------------------------------------------------------- |
| ANSI  | American National Standards Institute                   |
| ATM   | Asynchronous Transfer Mode                              |
| CCITT | Comite Consulatif International Telegraphique et Telephonique |
| FDDI  | Fiber Distributed Data Interface                        |
| FTP   | File Transfer Protocol                                  |
| HTTP  | Hyper Text Transfer Protocol                            |
| IE    | Information Element                                     |
| IISP  | Interim Inter-Switch Signaling Protocol                 |
| ITU   | International Telecommunications Union                  |
| LEC   | LAN Emulation Client                                    |
| MIB   | Management Information Base                             |
| MPOA  | Multiprotocol Over ATM                                  |
| NCCI  | Network Connection Correlation Identifier               |
| PNNI  | Private Network to Network Interface                    |
| PVC   | Permanent Virtual Circuit                               |
| SNMP  | Simple Network Management Protocol                      |

-continued

| Term | Definition |
| --- | --- |
| SVC | Switched Virtual Circuit |
| UNI | User to Network Interface |
| VCI | Virtual Channel Identifier |
| VPI | Virtual Path Identifier |

General Description

The present invention is a system for probing one or more SVCs that enables a network management station to setup a probe event in advance before the SVC is created. Upon the creation of the SVC, the data is captured and sent to the network management station without any further intervention required. Note that the system of the present invention is applicable to any connection-oriented network that utilizes signaling to establish connections between network users. For illustration purposes, the probing system of the present invention is described within the context of an ATM network. This, however, is not intended to limit the scope of the present invention.

Figure 1:
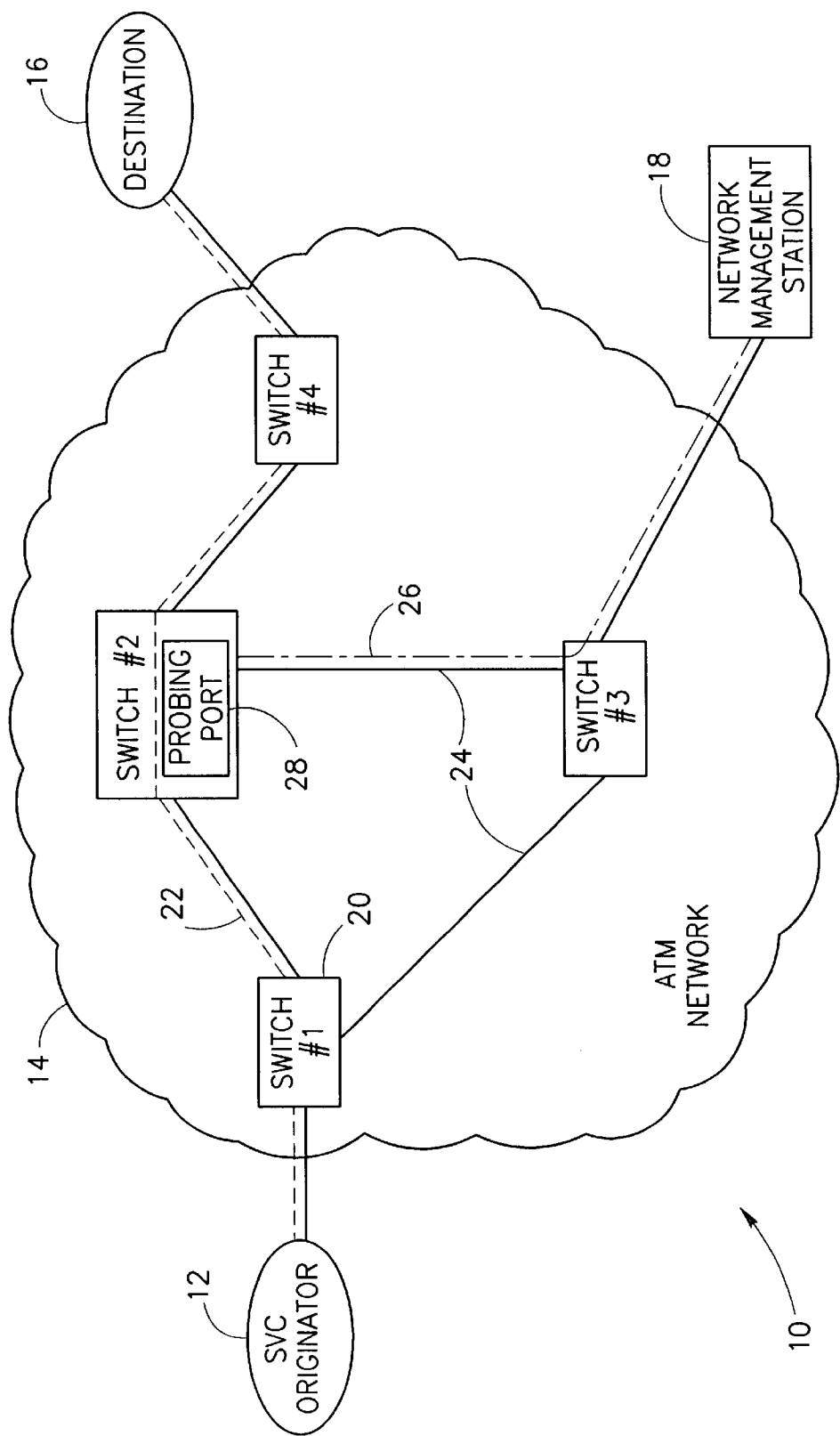
FIG. 1 is a block diagram illustrating an ATM network including an SVC originator, a destination and a network management station configured to probe one or more SVCs in accordance with the present invention.

A block diagram illustrating an ATM network including an SVC originator, a destination and a network management station configured to probe one or more SVCs in accordance with the present invention is shown in FIG. 1. The network, generally referenced 10, comprises several switches 20, labeled switch #1 through switch #4, links 24, an SVC originator 12, destination 16, ATM network 14 and network management station 18.

The SVC originator can be any network device that is capable of establishing SVCs, and may include, for example, an ATM end station, Ethernet based edge device, LEC, MPOA Client, etc. The SVC originator is operative to create an SVC (represented by dotted line 22) to the destination via switch #1 and switch #2. The network management station comprises control means, using the present invention, that is operative to tap into and probe the traffic flowing on the SVC 22. The probed data is transmitted to the network management station 18 via a previously established PVC (represented by the dotted/dashed line 26).

The SVC is probed via the operation of control means on the SVC originator and control means on the switch that is ultimately probed. The network management station is effective to establish a probing port 28 on the switch to be probed. In this example, switch #2 is selected as the probing switch. Normally, the network manager would have knowledge of the network and would have some idea of the possible route that the SVC will take. With this knowledge an appropriate switch can be chosen in which to establish both the probing port and an associated PVC from the network management station to the probed switch.

Once an SVC is setup and configured for probing, the data transmitted over the SVC is also transmitted to the network management station 18. The actual probing occurs in the probed switch via the probing port. The PVC is established beforehand, i.e., before the establishment of the SVC to be probed, and is usually established in a manual fashion. Data that passes over the SVC is duplicated and transmitted via the probing port to the network management station.

Figure 2:
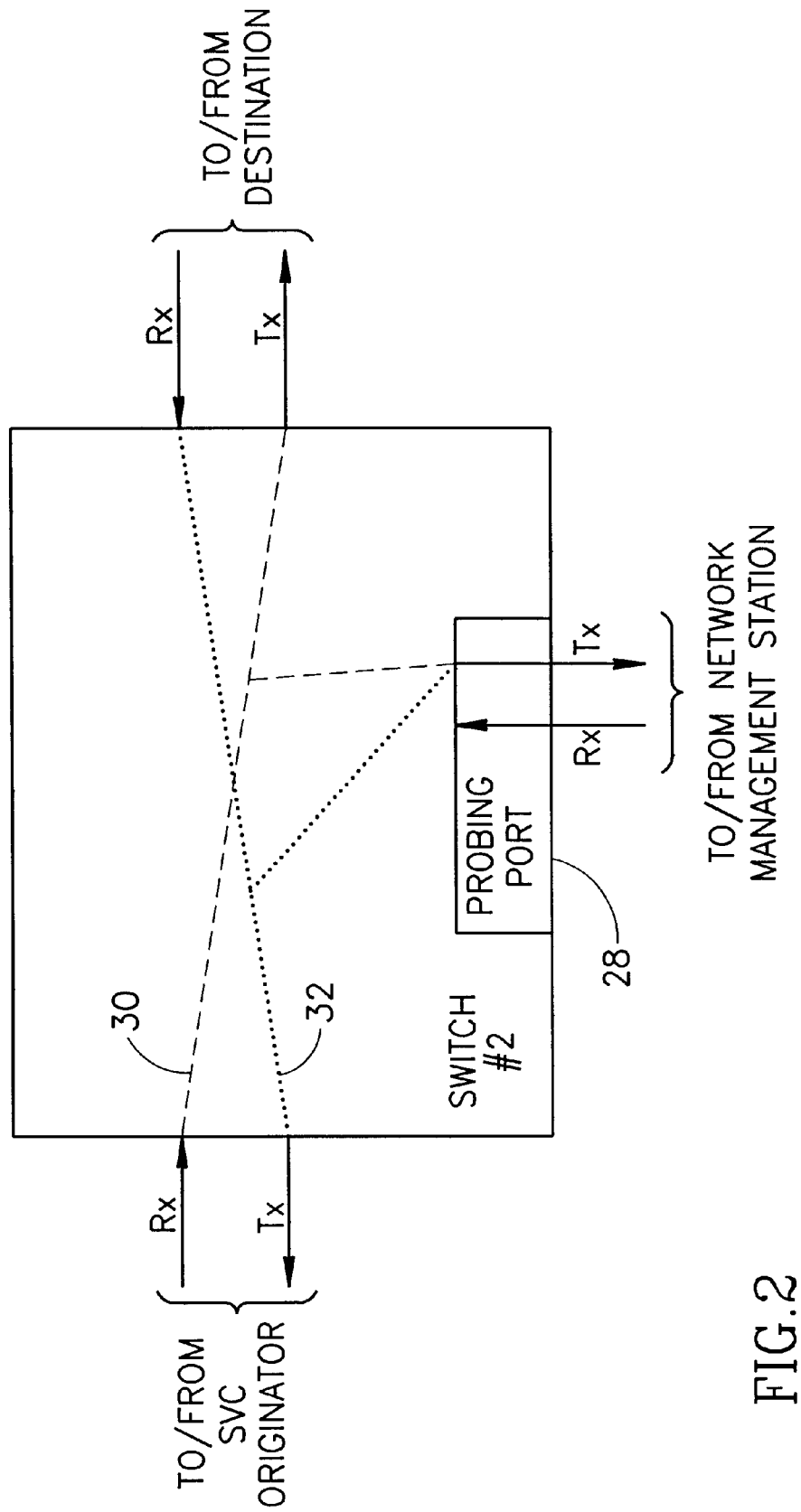
FIG. 2 is a diagram illustrating the multicast connections within the switch configured to probe one or more SVCs.

A diagram illustrating the multicast connections within the switch configured to probe one or more SVCs is shown in FIG. 2. This diagram illustrates in more detail the path taken by the data within the probed switch (switch #2 in this example). Shown are the Tx and Rx links to and from the SVC originator, the Tx and Rx links to and from the destination and the Tx and Rx links to and from the network management station. Each of the connections may pass through zero or more intermediary switches along the way.

In accordance with the invention, the probed switch is configured so that the network management station is able to only listen to the SVC and cannot inject any data. Thus, there is no connection shown from the Rx from the network management station to the either the SVC originator or the destination. The management station is, however, able to listen to both data directions of the SVC.

The switch utilizes standard well-known multicast techniques to establish point to multipoint connections between the three entities. Multicasting techniques in ATM switches and other network switching equipment are well known and are not described in detail here. In particular, the ingress data from the SVC originator is forwarded to the Tx egress port towards the destination and to the Tx egress probing port 28 toward the management station, as represented by dashed line 30. The data is sent out toward the management station from the SVC originator using a first VPI/VCI. Similarly, the ingress data from the destination is forwarded to the Tx egress port towards the SVC originator and to the Tx egress probing port 28 toward the management station, as represented by dotted line 32. The data is sent out toward the management station from the SVC originator using a second VPI/VCI.

Two VPI/VCIs are necessary in order to distinguish between data flowing in either direction. The network management station is operative to construct frames from the cells received for debugging and diagnostic purposes and thus the cells must be kept separate for each direction.

To more easily distinguish between traffic from the SVC originator versus traffic to it, the network management station can assign odd VPI/VCIs to traffic flowing in one direction and even VPI/VCIs to traffic flowing in the opposite direction.

In accordance with the present invention, the SVC originator is setup and configured beforehand to enable the probing of the SVC once it is established. An Information Element (IE) is created and used in the signaling protocol to inform the switches along the route of the SVC that that particular SVC is to be probed. In addition, the PVC to the probed switch and the probing port on the switch are also established beforehand. The setup method of establishing an SVC probe will now be described in more detail.

SVC Probing Setup Method

Figure 3:
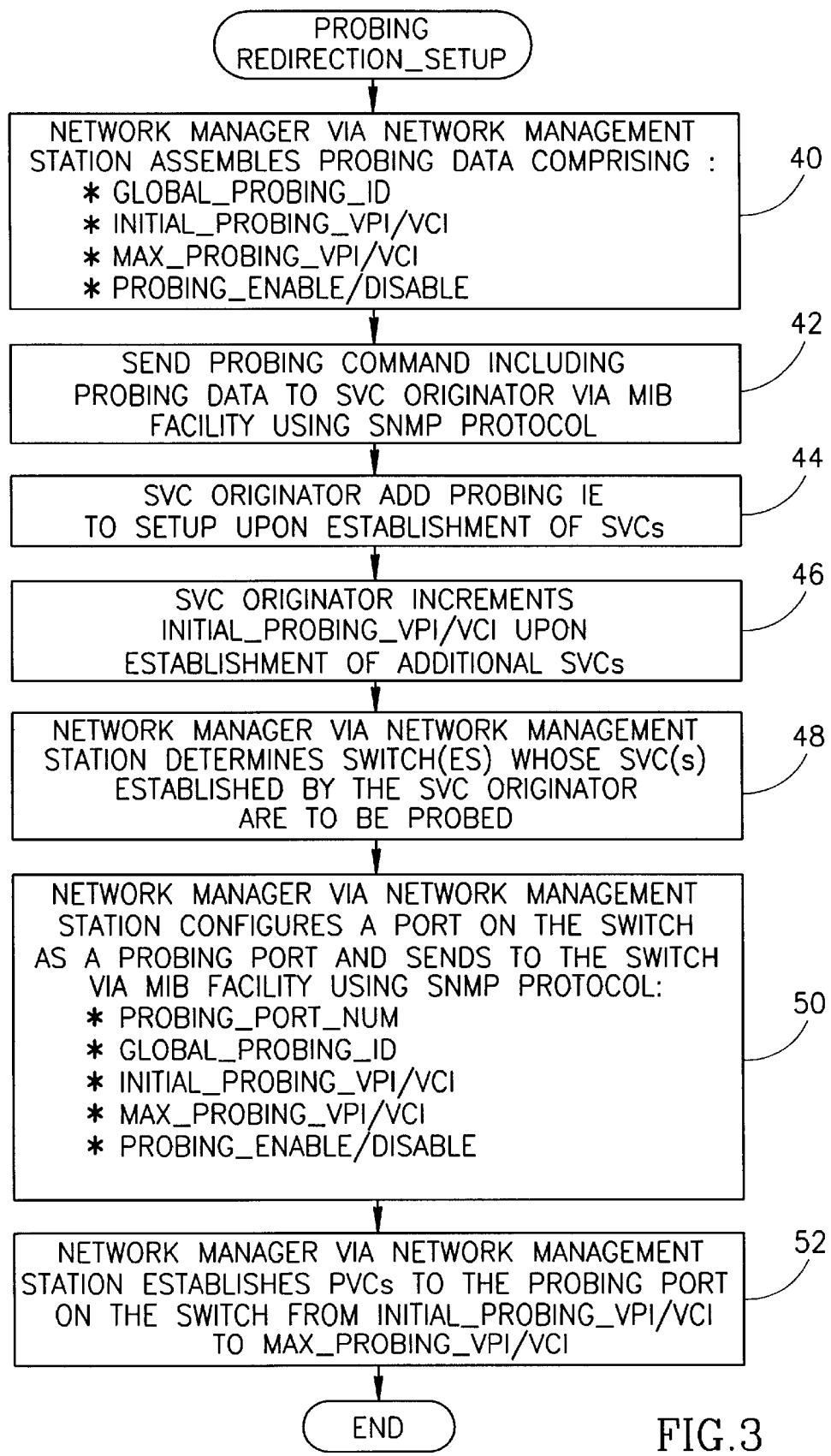
FIG. 3 is a flow diagram illustrating the probing redirection setup portion of the SVC probing mechanism of the present invention.

A flow diagram illustrating the probing redirection setup portion of the SVC probing mechanism of the present invention is shown in FIG. 3. The setup phase of the probe redirection method comprises two portions. One portion deals with setting up the SVC originator and the second portion deals with setting up the switch to be probed.

Initially, the network manager must identify the SVC that she/he wishes to probe. The SVC originator is identified and the network manager, via the network management station, assembles the probing data (step 40). The probing data comprises several parameters that are used to characterize the SVC probe. In particular, the probing IE comprises a global probing ID, initial probing VPI/VCI, maximum probing VPI/VCI and a probing enable/disable parameter.

The global probing ID is an ID number that uniquely identifies a specific SVC whose traffic is to be probed. The global probing ID is generated by the network management station and is globally unique throughout the network. It is analogous to the NCCI number in PNNI routing. The probed switch is also configured with the global probing ID and uses it in determining whether to probe an SVC being established.

The initial probing VPI/VCI is the VPI/VCI within the probing port on the probed switch to which the SVC traffic is to be directed (in addition to its original path). In accordance with the invention, multiple SVCs can be probed simultaneously. Each SVC to be probed is assigned to a different VPI/VCI on the probing port of the probed switch; The initial probing VPI/VCI indicates the first VPI/VCI to be assigned to the first SVC established by the SVC originator. For each additional SVC, the VCI is incremented up to a maximum VPI/VCI that is indicated by the maximum probing VPI/VCI. Note that maximum probing VPI/VCI range in both the SVC originator and probed switch is configurable by the network manager.

The probing enable/disable parameter is a flag that tells the SVC originator whether to enable or disable probing. Once probing is initiated it can be turned off by setting this parameter to the disable setting and sending it to the SVC originator. This parameter can be used to save resources and processing time on both the SVC originator and the probing switch.

Once the probing data is generated, it is sent to the SVC originator via a MIB facility using any suitable protocol such as the SNMP protocol (step 42). Once received, the SVC originator will use this probing data to generate a probing IE that is included with the SETUP request message for all SVCs generated from that point in time onward (step 44). For each SVC established, the SVC originator increments the VPI/VCI until the maximum probing VPI/VCI is reached as indicated by the probing data received from the management station (step 46). Since the network manager does not know beforehand the number of SVCs the SVC originator will open, it is desirable to be able to give a range of VPI/VCI pairs for the SVC originator to utilize.

Note that the network manager, via the network management station, utilizes standard control means to send the command to the SVC originator. Such control means may comprise, for example, a MIB facility transmitted using the Simple Network Management Protocol (SNMP) which is in widespread use and well known in the network art.

In the second portion of the setup procedure, the network manager, via the network management station, identifies the one or more switches whose SVC(s) established by the SVC originator are to be probed (step 48). This typically requires some knowledge of the route that the SVC will take. In practice, in order to make sure the desired SVC will be probed, the network manager may identify a plurality of switches that are to be probed. In this case, each switch probed is assigned a unique global probing ID and a separate command must be issued to the SVC originator for each switch to be probed.

In the next step, the network manager, via the network management station, configures a port on the switch to be probed as a probing port and sends the following parameters to the switch via a MIB facility using the SNMP protocol: probing port number, global probing ID, initial VPI/VCI, maximum probing VPI/VCI and probing enable/disable (step 50). The probing port number is used to identify the probing port on the probed switch. The probing port is a regular port on the switch that has been configured as a probing port. Typically, the probing port is connected to a network communication analyzer tool. Note that in the case of multiple network management stations, the switch maintains a table of probing port numbers, each port number associated with one management station. The network manager, via the network management station, also establishes a PVC to the probing port on the probed switch (step 52).

The parameters other than the probing port number are similar to those the SVC originator is configured with. The SVC originator, however, uses the parameters to construct an IE that is sent in the SETUP request message. The global probing ID sent to the probed switch is used to identify different probing SVCs that arrive to the switch. The probing VPI/VCI, when combined with the probing port number, uniquely identify a port and VPI/VCI pair which are used to establish the multicast connection coupling the SVC to the PVC. The multicast connection is established upon the SETUP request signaling message reaching the probed switch.

Note that the initial and maximum probing VPI/VCI pairs specified sent to the probed switch by the management station may be different than those sent in the command to the SVC originator. In particular, the maximum probing VPI/VCI parameter may be different such as when it is desired to further limit the predefined maximum VCI value configured in the SVC originator in order to share the VPI/VCI resources of the probing port with a plurality of SVC originators whose SVCs may pass through the same switch. The initial probing VPI/VCI associated with a particular global probing ID must be the same for both SVC originator and probed switch. The range of VPI/VCIs, however, may differ, for example, when the network manager desires to aggregate many global probing IDs on the same PVC.

In this case, it may be desirable to limit the number of SVCs redirected to the management station for a particular global probing ID. For example, in the case of more than one SVC originator establishing SVCs through the same probing switch, it may be desirable to place a lower VCI limit to accommodate the increased number of SVCs to be probed. In practice, the network manager can configure each SVC originator with the maximum VCI limit but configure the probed switch with lower maximum VCIs for the different global probing IDs.

Once the maximum probing VPI/VCI is reached, additional SVCs to be probed cannot be accommodated on the probed switch. Note that it is the responsibility of the management station to allocate and assign the initial and maximum VPI/VCIs such that each global probing ID is allocated a unique range of VPI/VCI pairs on the PVC.

The probing enable/disable parameters can be set independently of the SVC originator. In other words, the SVC originator and probed switch can be enabled and disabled independently.

SVC Probing Operation Method

Figure 4:
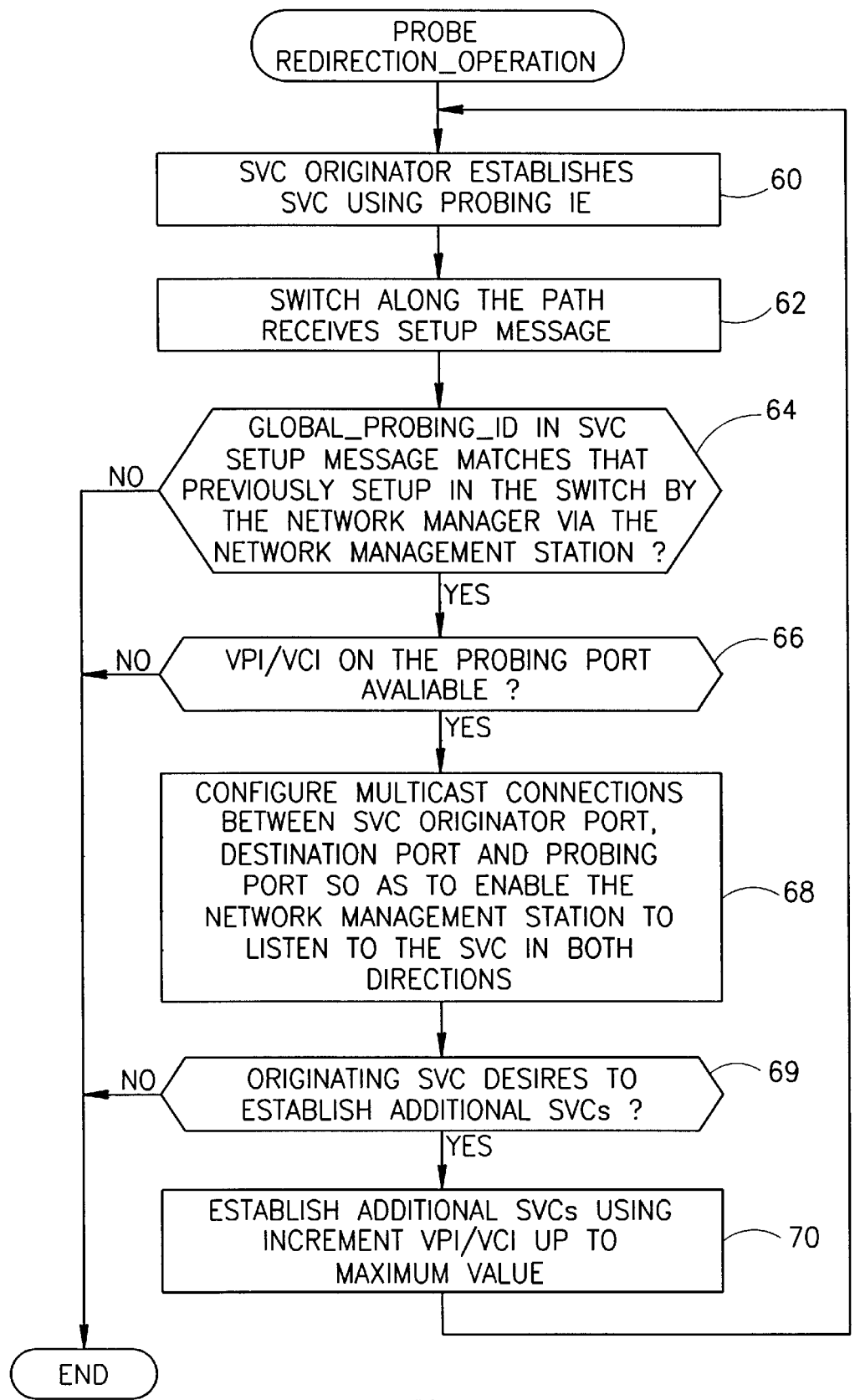
FIG. 4 is a flow diagram illustrating the probing redirection operation portion of the SVC probing mechanism of the present invention.

A flow diagram illustrating the probing redirection operation portion of the SVC probing mechanism of the present invention is shown in FIG. 4. When the SVC establishes an SVC, it incorporates the probing IE in the SETUP request message (step 60). The interim switches along the path receive the probing IE and if they support the feature of the present invention, they configure their switches accordingly (step 62). Each switch along the path that supports the feature attempts to match the global probing ID in the SVC setup message with that previously setup in the switch by the network manager, via the network management station (step 64). If a match is not found, the setup of the SVC proceeds as normal.

If a match was found, however, the switch then checks whether a VPI/VCI on the probing port is available (step 66). If not, i.e., the maximum probing VPI/VCI has been reached, setup proceeds as normal and the SVC cannot be probed on that particular switch.

If a VPI/VCI is available, the switch configures a multicast point to multipoint connection between the SVC originator port, destination port and probing port as previously described in connection with FIG. 2 so as to enable the management station to listen to the SVC in both directions (step 68).

If the SVC originator has additional SVCs to establish (step 69), then additional SETUP requests are generated and SVCs are established as long as a VPI/VCI pair is available (step 70). The method continues with step 60 and the additional SVC is established. For each additional SVC established, the VPI/VCI is incremented up to the maximum VPI/VCI. If no additional SVCs are to be established, the method terminates.

SNMP MIB Description

As described previously, the SVC originator and probed switch are setup and configured using standard management techniques, such as SNMP. The parameters that are set at the probing setup stage use standard SNMP management that is presently built in to most network elements such as ATM switches. The following Management Information Base (MIBs) can be defined at the SVC originator and probed switches to permit the configuration thereof.

The probing parameters implemented at the SVC originator is given below as expressed in standard MIB notation. Note that one skilled in the art can vary the following MIBs in numerous ways without departing from the scope of the present invention.

```
AtmfProbingParametersOriginatorTable
    SYNTAX SEQUENCE OF AtmfProbingParameters-
        OriginatorEntry
    ACCESS read/write
    STATUS mandatory
    DESCRIPTION "A table created at the SVC originator
        that contains the probing parameters for the SVC
        originator"
AtmfProbingParametersOriginatorEntry
    SYNTAX AtmfProbingParametersOriginatorEntry
    ACCESS read/write
    STATUS mandatory
    DESCRIPTION "A table entry implemented at the
        SVC originator that contains the probing parameters
        for the SVC originator"
    INDEX {atmfProbingID}
AtmfProbingParametersOriginatorEntry::=
    SEQUENCE {
        AtmfProbingID
            INTEGER,
        AtmfVpi
            INTEGER,
        AtmfVci
            INTEGER,
        AtmfMaxVci
            INTEGER,
        AtmfEnable
            INTEGER,
    }
```

The probing parameters implemented at the probed switch, i.e., the network side, is given below as expressed in standard MIB notation.

```
AtmfProbingParametersNetworkTable
    SYNTAX SEQUENCE OF AtmfProbingParameter-
        sNetworkEntry
    ACCESS read/write
    STATUS mandatory
    DESCRIPTION "A table created at the network side
        that contains the probing parameters for the probed
        switch"
AtmProbingParametersNetworkEntry
    SYNTAX AtmfProbingParametersNetworkEntry
    ACCESS read/write
    STATUS mandatory
    DESCRIPTION "A table entry implemented at the
        network side that contains the probing parameters for
        the probed switch"
    INDEX {atmfProbingID}
AtmfProbingParametersNetworkEntry::=
    SEQUENCE {
        AtmfProbingID
            INTEGER,
        AtmfProbingPortNum
            INTEGER,
        AtmfVpi
            INTEGER,
        AtmfVci
            INTEGER,
        AtmfMaxVci
            INTEGER,
        AtmfEnable
            INTEGER,
    }
```

Figure 5:
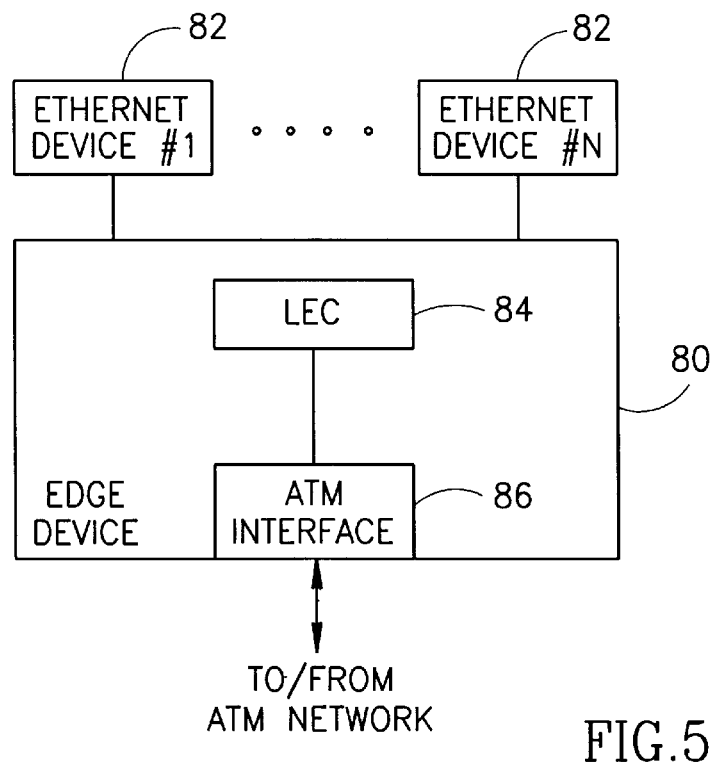
FIG. 5 is a block diagram illustrating the SVC origination entities in an example edge device.
Figure 6:
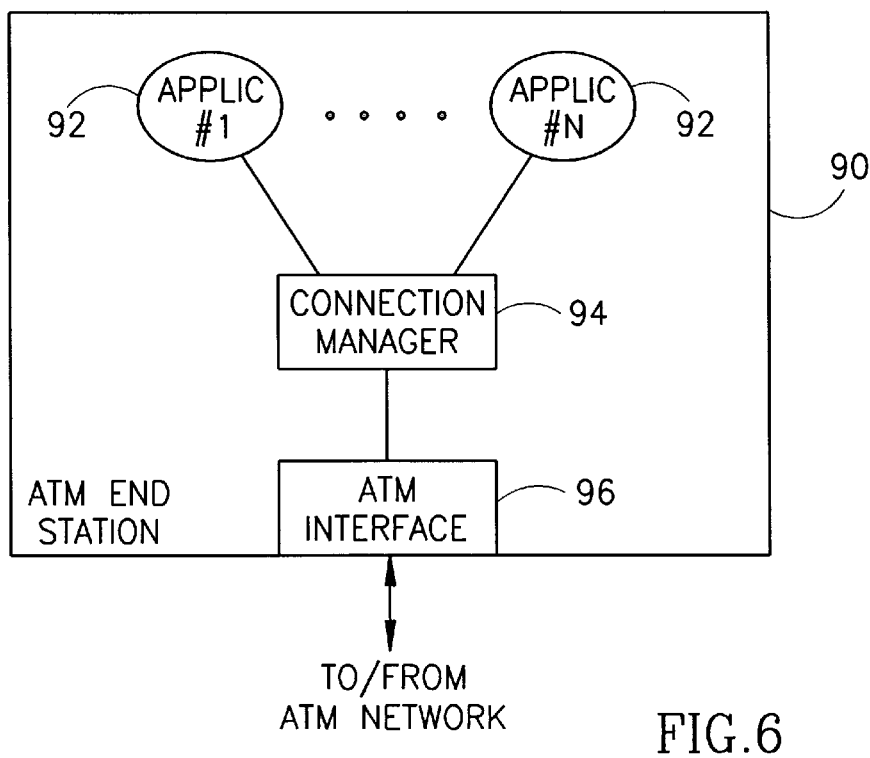
FIG. 6 is a block diagram illustrating the SVC origination entities in an example ATM end station.

As described previously, the SVC originator is any entity that is capable of creating and establishing SVCs. Two examples of possible SVC originators are illustrated in FIGS. 5 and 6. The concept of an SVC originator can be generalized to a specific application within a workstation that is connected to the ATM network. FIG. 5 illustrates an example ATM edge device, generally referenced 80, that comprises one or more Ethernet ports connected to Ethernet devices 82, labeled Ethernet device #1 through Ethernet device #N. The edge device 80 comprises an ATM interface 86 which the Ethernet devices communicates with via the LEC 84. In this case, it is the LEC 84 that is the SVC originator.

The edge device can be configured, using the system of the present invention, to include the probing IE with SETUP request messages generated by the LEC and transmitted through the ATM interface to the ATM source node in the ATM network. Depending on the extent of the knowledge of the network manager, the SVCs established for different Ethernet devices can be probed independently. The network management station assigns a different global probing ID to each Ethernet device and sends the command to a different LEC, one LEC assigned to each Ethernet device to be probed. The SVC originator MIB presented above would normally be incorporated in the overall MIB built into each LEC.

The concept of a SVC originator can be generalized to a specific application within a workstation that is connected to the ATM network. In this case, the SVC originator MIB presented above, is part of the overall MIB of the specific application. If there is more than one application within the workstation, then each will have an instance of that MIB. Thus, each application can be a SVC originator or, in the alternative, the connection manager 94 can also be a SVC originator. Choosing one or the other depends on the desired level of granularity in the probing process.

FIG. 6 illustrates an ATM end station, generally referenced 90, that comprises a plurality of applications 92, labeled application #1 through application #N. The applications establish connections to destinations via the connection manager 94. Each application comprises an API for opening SVCs. An ATM adapter 96 interfaces the end station to the ATM network. In this case, each application 92 comprises an MIB that includes the SVC originator MIB presented above. In this fashion, SVCs created by individual applications can be probed. The applications may include, for example, FTP, SMTP email, HTTP web browser, telnet, etc.

Figure 7:
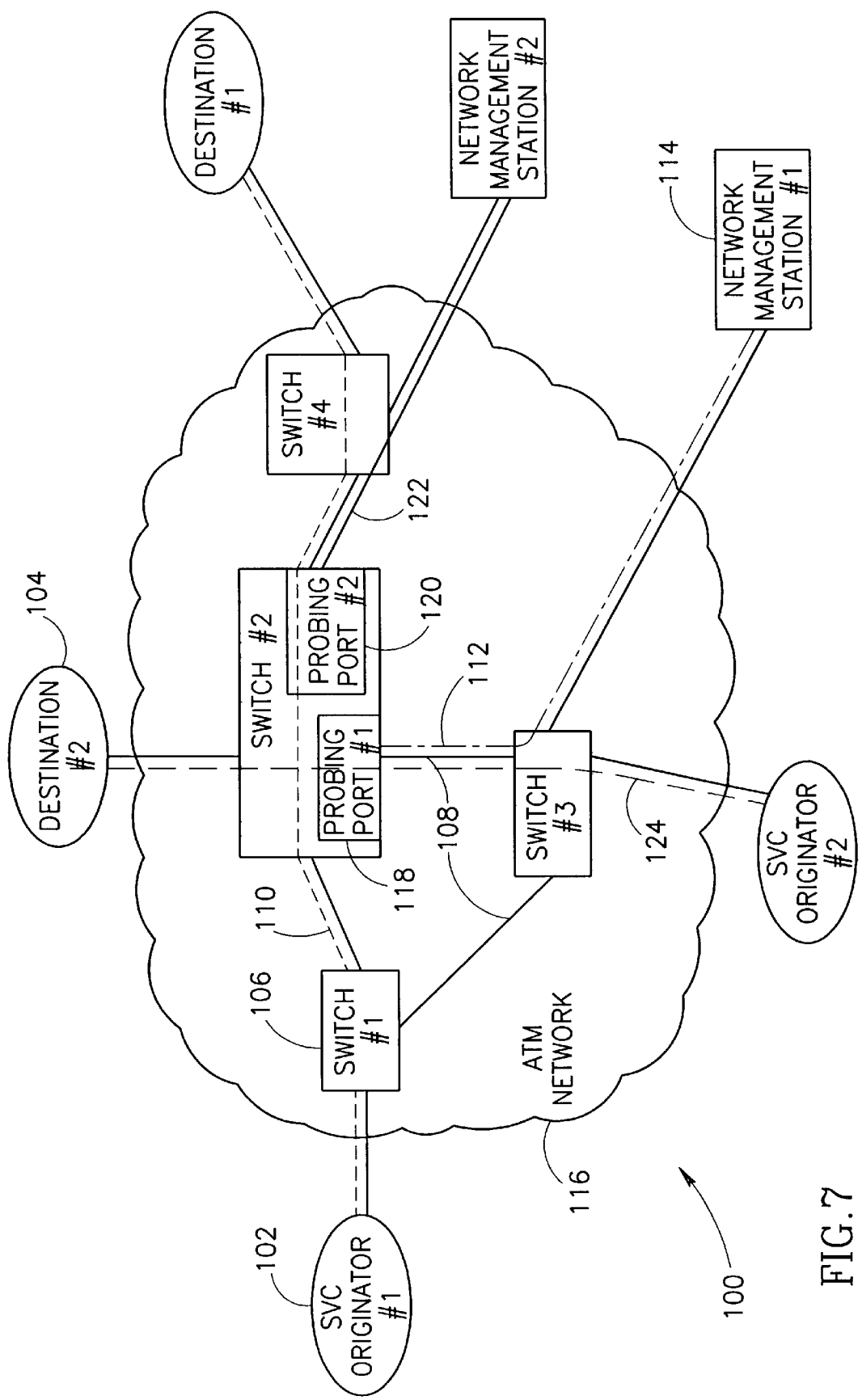
FIG. 7 is a block diagram illustrating an ATM network including a plurality of SVC originators, a plurality of destinations and a plurality of network management stations configured to probe one or more SVCs in accordance with the present invention.

As described hereinabove, the probing system of the present invention can be used to simultaneously probe more than a single SVC from a SVC originator. In addition, the invention can be used to probe multiple SVCs from multiple SVC originators. Each SVC originator establishing SVCs to different destinations. FIG. 7 illustrates a network, generally referenced 100, comprising a plurality of SVC originators 102, a plurality of destinations 104, ATM switches 106, links 108 connecting the switches, a plurality of network management stations 114 configured to probe one or more SVCs in accordance with the present invention and an ATM network 116.

For illustration purposes, only two SVC originators establishing SVCs to two destinations and two network management stations are illustrated. Network management station #1 sets up PVC 112 to probing port #1 118 on switch #2 using a first global probing ID and VPI/VCI range. SVC originator #1 establishes. SVC 110 to destination #I via switch #2 incorporating the global probing ID in the probing IE transmitted with the SETUP request message. Bidirectional traffic is multicast to the PVC 112 to network management station #1 using the probing redirection setup and operation methods of the present invention.

Similarly, network management station #2 sets up PVC 122 to probing port #2 120 on switch #2 using a unique global probing ID different that that used by network management station #1. SVC originator #2 establishes SVC 124 to destination #2 via switch #2 using the global probing ID configured by network management station #2. Bidirectional traffic is multicast to the PVC 122 to network management station #2 using the probing redirection setup and operation methods of the present invention.

To enable multiple probes from one or more management stations, each switch maintains a table of global probing IDs which functions to map the global probing ID to a probing port, i.e., management station, and associated VPI/VCI pairs.

Note that the network manager may set up multiple switches to be probed, as it is not known with definiteness which switch the route for the SVC may take. In this case, each potential probing switch can be configured with the same global probing ID and probing port that the SVC originator is configured with. Alternatively, for each potential probing switch, the network management station may configure the SVC originator with a different global probing ID. Each global probing ID corresponding to that configured in a different probing switch.

In accordance with the invention, as an alternative, the network management station, e.g., communication analyzer, may be located either remote to the probed switch or it can be directly connected to it. When directly connected, it is connected directly to the probing port. When connected remotely, it is connected to a network connection port that is connected via a PVC to the probing port on the probing switch. In this case, the probing port would typically be connected to other switches in the network and the PVC range that is dedicated for probing (as defined by the maximum probing VPI/VCI) will have a PVC for each VPI/VCI that is opened from the probing port to the remote location port (the network management station) to which a communications analyzer is connected. Note that the establishment of PVCs is performed using standard means commonly found in connection oriented networks such as ATM networks.

Note also that the network management station does not communicate for purposes of the probing system of the present invention with destinations associated with each of the SVCs probed. The network management station does not require any knowledge of the destination.

While the invention has been described with respect to a limited number of embodiments, it will be appreciated that many variations, modifications and other applications of the invention may be made.

What is claimed is:

1. A method of probing one or more Switched Virtual Circuits (SVCs) in a connection oriented network, said method comprising the steps of:

configuring a SVC originator with a first set of probe parameters comprising a global probing ID before establishment of an SVC to be probed, wherein said global probing ID is globally unique throughout said network;

configuring a probing switch with a second set of probing parameters comprising said global probing ID, before establishment of said SVC to be probed;

establishing a PVC between a probing port on said probing switch and a network management station (NMS), before establishment of said SVC to be probed;

incorporating said first set of probing parameters including said global probing ID in a setup request message generated by said SVC originator upon establishment of said SVC to be probed;

establishing a first multicast connection from a port receiving traffic from said SVC originator to a port sending traffic toward said destination and said probing port;

establishing a second multicast connection from a port receiving traffic from said destination to a port sending traffic toward said SVC originator and said probing port; and copying bidirectional traffic between said SVC originator and said destination through said first multicast connection and said second multicast connection to said network management station via said probing port and said PVC.

2. The method according to claim 1, wherein said first set of probing parameters comprises initial probing VPI/VCI and maximum probing VPI/VCI parameters, whereby upon each successive SVC established, said SVC originator increments said VCI up to said maximum.

3. The method according to claim 1, wherein said first set of probing parameters comprises a probing enable/disable parameter operative to turn probing off in said SVC originator.

4. The method according to claim 1, wherein said setup message comprises a probing Information Element (IE) comprising said global probing ID, initial probing VPI/VCI, maximum probing VPI/VCI and probing enable/disable parameters.

5. The method according to claim 1, wherein said SVC originator is configured utilizing Simple Network Management Protocol (SNMP) messages generated by said network management station.

6. The method according to claim 1, wherein said probing switch is configured utilizing Simple Network Management Protocol (SNMP) messages generated by said network management station.

7. The method according to claim 1, further comprising the step of maintaining a table of global probing IDs when a plurality of SVC originators are present in said network.

8. The method according to claim 1, further comprising the step of ceasing, on said SVC originator, to incorporate said first set of probing parameter in said setup message when a maximum probing VPI/VCI has been reached.

9. The method according to claim 1, further comprising the step of assigning, in said probing switch, odd VPI/VCI numbers for said probing port to traffic flowing in a first direction and even VPI/VCI numbers for traffic flowing in a second direction opposite that of said first direction.

10. The method according to claim 1, further comprising the step of assigning, in said probing switch, even VPI/VCI numbers for said probing port to traffic from said SVC originator.

11. An apparatus for probing one or more Switched Virtual Circuits (SVCs) in a switch within a connection oriented network, comprising:
   an SVC originator port for receiving a setup message from an SVC originator, wherein said SVC originator is configured before establishment of an SVC to be probed in accordance with a first set of probe parameters, said setup message and said first set of probe parameters comprising a global probing ID adapted to be globally unique throughout said network;
   a probing port adapted to be configured before establishment of said SVC to be probed in accordance with a second set of probe parameters comprising said global probing ID, said probing port in communication with a Network Management System (NMS) via a Permanent Virtual Circuit (PVC) established before establishment of said SVC to be probed;
   a first multicast connection configured from said SVC originator port to a destination port and said probing port in response to receiving said setup message from said SVC originator comprising said global probing ID;
   a second multicast connection configured from said destination port to said SVC originator port and said probing port in rose to receiving said setup message from said SVC originator comprising said global probing ID; and
   wherein bidirectional tic is copied between said SVC originator and said destination through said first multicast connection and said second multicast connection to said NMS via said PVC so as to enable said NMS to listen to a probed SVC in both directions, wherein bidirectional traffic between said SVC non and said destination port are copied through said multicast connection to said NMS via said probing port and said PVC.

12. The apparatus according to claim 11, wherein said first set of probing parameters comprises initial probing VPI/VCI and maximum probing VPI/VCI parameters, whereby upon each successive SVC established, said SVC originator increments said VCI up to said maximum.

13. The apparatus according to claim 11, wherein said first set of probing parameters comprises a probing enable/disable parameter operative to turn probing off in said SVC originator.

14. The apparats according to claim 11, where said setup message comprises a probing Information Element (IE) comprising said global probing ID, initial probing VPI/VCI, maximum probing VPI/VCI and probing enable/disable parameters.

15. The apparatus according to claim 11, wherein said SVC originator is configured utilizing Simple Network Management Protocol (SNMP) messages generated by said network management station.

16. The apparatus according to claim 11, wherein said probing switch is configured utilizing Simple Network Management Protocol (SNMP) messages generated by said network management station.

17. The apparatus according to claim 11, further comprising means for maintaining a table of global probing IDs when a plurality of SVC originator are present in said network.

18. The apparatus according to claim 11, further comprising means for ceasing, on said SVC originator, to incorporate said first set of probing parameters in said setup message when a maximum probing VPI/VCI has been reached.

19. The apparatus according to claim 11, further comprising means for assigning, in said probing switch, odd VPI/VCI numbers for said probing port to traffic flowing in a first direction and oven VPI/VCI numbers for traffic flowing in a second direction opposite that of said first direction.

20. The apparatus according to claim 11, further comprising means for assigning in said probing switch, even VPI/VCI numbers for said probing port to traffic from said SVC originator.

21. A method of establishing one or more probed Switched Virtual Circuits (SVCs) for use in a Network Management System (NMS) within a connection oriented network, said method comprising the steps of:
   sending a first command to an SVC originator before establishment of an SVC to be probed, wherein said first command comprising a first set of probe parameters including a global probing ID for inclusion in an Information Element (IE) to be sent in a setup message, wherein said global probing ID is ted to be globally unique throughout said network;
   sending a second command to a probing switch before establishment of said SVC to be probed, said probing switch having one or more SVCs to be probed, said second command comprising a second set of probe parameters including said global probing ID and causing said probing switch to establish a first multicast connection from an SVC originator port to a destination port and a probing port, and a second multicast connection form said designation port to said SVC originator port and said probing port;
   establishing a Permanent Virtual Circuit (PVC) between said NMS and said probing port on said probing switch before establishment of said SVC to be probed; and
   upon establishment of said SVC receiving bi-directional communications between said SVC originator and a destination copied through said first multicast connection and said second multicast connection to said NMS via said probing port and said PVC.

22. The method according to claim 21, wherein said first set of probing parameters comprises initial probing VPI/VCI and maximum probing VPI/VCI parameters, whereby upon each successive SVC established, said SVC originator increments said VCI up to said maximum.

23. The method according to claim 21, wherein said fist set of probing parameters comprises a probing enable/disable parameter operative to turn probing off in said SVC originator.

24. The method according to claim 21, wherein said setup message comprises a probing information Element (IE)

comprising said global probing ID, initial probing VPI/VCI, maximum probing VPI/VCI and probing enable/disable parameters.

25. The method according to claim 21, wherein said first command is transmitted to said SVC originator utilizing Simple Network Management Protocol (SNMP) messages generated by said NMS.

26. The method according to claim 21, wherein said second command is transmitted to said probing switch utilizing Simple Network Management Protocol (SNMP) messages generated by said NMS.

27. The method according to claim 21, further comprising the step of maintaining a table of global probing of when a plurality of SVC originators are present in said network.

28. The method according to claim 21, further comprising the step of ceasing, on said SVC originator, to incorporate said first set of probing parameters in said setup message when a maximum probing VPI/VCI has been reached.

29. The method according to claim 21, further comprising the step of assigning, in said probing switch, odd VPI/VCI numbers for said probing port to traffic flowing in a first direction and even VPI/VCI numbers for traffic flowing in a second direction opposite that of said first direction.

30. The method according to claim 21, further comprising the step of assigning, in said probing switch, even VPI/VCI numbers for said probing port to traffic from said SVC originator.

* * * * *